United States Patent [19]

Courty

[11] 3,727,454
[45] Apr. 17, 1973

[54] ULTRASONIC SYSTEMS FOR CARRYING OUT FLOW MEASUREMENTS IN FLUIDS

[75] Inventor: Albert Courty, Paris, France
[73] Assignee: Thomson-CSF, Paris, France
[22] Filed: Feb. 19, 1971
[21] Appl. No.: 116,880

[30] Foreign Application Priority Data

Feb. 27, 1970 France................................7007189

[52] U.S. Cl. ..............................................73/194 A
[51] Int. Cl. ............................G01f 1/00, G01p 5/00
[58] Field of Search.........................73/194 A, 290 V

[56] References Cited

UNITED STATES PATENTS

| | | | |
|---|---|---|---|
| 3,336,801 | 8/1967 | Snavely | 73/189 |
| 3,402,606 | 9/1968 | Bruha | 73/194 A |
| 3,440,876 | 4/1969 | Hayes et al. | 73/194 A |
| 3,486,377 | 12/1969 | Franchi | 73/290 V |

Primary Examiner—Charles A. Ruehl
Attorney—Cushman, Darby & Cushman

[57] ABSTRACT

An ultrasonic system for carrying out flowrate measurement in fluids comprises a generator transmitting a frequency modulated wave signal. This signal is converted into an ultrasonic signal by a first transducer. A second transducer, after propagation across the fluid receives this signal, and converts this into a delayed electric wave train.

This wave train delivered to a dispersive delay line is transformed therein into a train of very short duration.

This latter signal after detection, allows accurate determination of the propagation time across the fluid.

5 Claims, 4 Drawing Figures

ULTRASONIC SYSTEMS FOR CARRYING OUT FLOW MEASUREMENTS IN FLUIDS

The present invention relates to improvements in ultrasonic systems and methods for carrying out flow measurement in fluids, in particular fluids which are flowing through a pipe.

Ultrasonic techniques involve the measurement of the time of propagation of acoustic waves over one or more trajectories through the fluid concerned. The measurements can be carried out without contact with the fluid and thus without modifying the flow conditions to which the fluid is subjected.

In prior art systems, even where the signal transmitted through an acoustic trajectory or link across the fluid has a very short duration, the time of arrival of the signal at the receiving end cannot generally be determined with anything more than mediocre accuracy, as much because of the random phenomena as because of the selectivity of the piezoelectric vibrators (transducers), which are used to convert the electrical signals into acoustic waves in the fluid, and vice versa. The signals received are generally detected in a transient condition by threshold devices, the inaccuracy being translated into terms of fluctuations in the time of clearance of the threshold in these devices.

The system and method in accordance with the invention do not exhibit these drawbacks since they make it possible to use relatively long signals which experience virtually no distortion during the acoustic trajectory; moreover, the characteristic measurement times do not occur during the transient condition of the signals.

According to the invention, there is provided an ultrasonic system for cyclically measuring the flow of a fluid in a pipe, comprising in combination:

first means for repeatedly generating a timing signal at the beginning of each measuring cycle;

second means triggered by said first means for generating a first electrical wave train of fixed duration frequency modulated according to a predetermined law between fixed upper and lower frequencies, at least a first pair of opposed transducer means for location on opposite sides of said pipe, including a first transducer for converting said first wave train into a first sound wave and for transmitting said first sound wave along a first path through the fluid within said pipe and a second transducer for receiving said transmitted first sound wave and for converting said received sound wave into a second electrical wave train;

first means for applying said first wave train to said first transducer;

first delay line means having a dispersive delay time versus frequency characteristic, fed by said second transducer for converting said second electrical wave train into a first compressed one of short duration;

first detector means fed by said first delay line means for delivering a first compressed pulse in response to said first compressed wave train;

a first bistable multivibrator having a first triggering input for receiving said timing signal and an output for delivering in response thereto a non-zero value constant voltage and a second triggering input for receiving said first compressed pulse and for delivering at said output in response thereto a zero value voltage, whereby said first multivibrator output delivers a first rectangular waveform having a duration equal to the sum of the sound wave propagation time interval across the fluid between said first and second transducers and the constant delay time interval provided by said delay line means.

This and other features of the present invention will become apparent from the following description, given by way of example, and with reference to the accompanying drawings in which.

Figure 1:
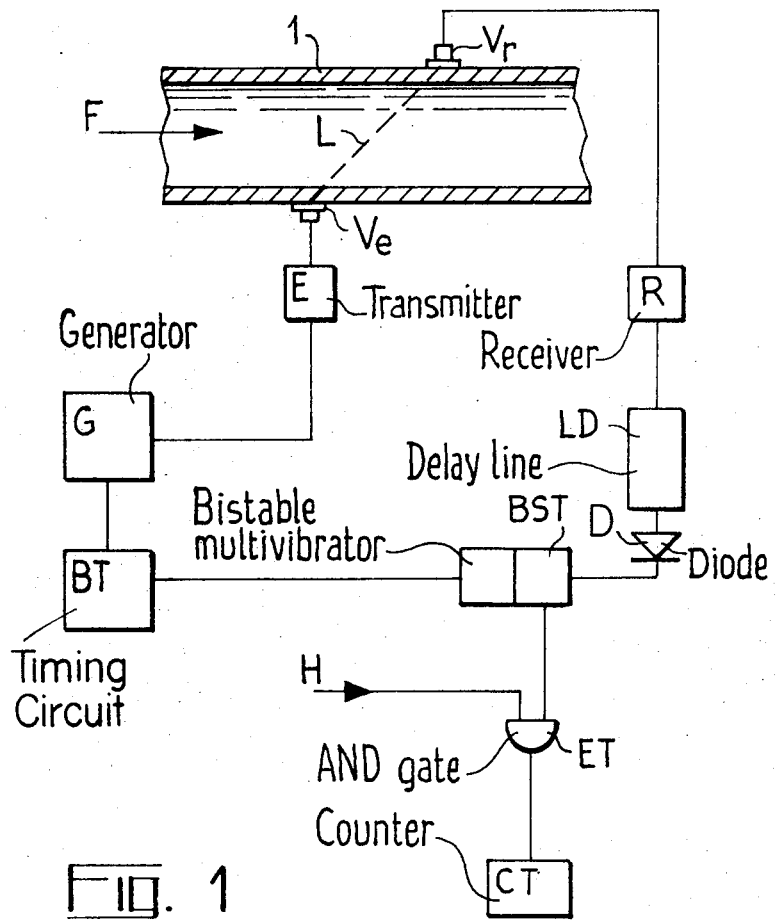
FIG. 1 is the block-diagram of a part of a system in accordance with the invention.

FIG. 1 illustrates the diagram of a circuit which incorporates the basic elements used in the system and method of the invention. In this Figure is shown a pipe section 1 through which a fluid F is flowing in the direction of the arrow. Piezoelectric vibrators $Ve$ and $Vr$ located externally of the pipe or internally thereof, define an acoustic trajectory or link of length L crossing the fluid F : the vibrator $Ve$ serves to convert an electrical signal into an acoustic wave which travels over the trajectory L and the vibrator $Vr$ carries out the reverse conversion. These vibrators are constituted by quartz crystals, ceramic or other piezoelectric plates which are acoustically coupled with the fluid through the pipe wall which may or may not be thinned down at the location of the vibrators.

An electrical signal generator G is capable of transmitting a wave train frequency modulated according to a predetermined law, and having a fixed duration, the upper frequency and the lower frequency being constant.

This generator G has an input connected to the output of a timing circuit BT, which generates at predetermined instants, pulses of short duration.

Time circuit BT has another output connected to one of the triggering inputs of a bistable multivibrator BST, having two stable states, the 0 state in which its output voltage has a zero value, the 1 state, for which its output voltage has a constant non-zero value.

Each pulse supplied by the BT timing circuit on the one hand, triggers the generator G which transmits a wave train and on the other hand, triggers the bistable multivibrator BST from state 0 to state 1.

Generator G is coupled to the transducer $Ve$ by means of a transmitter or amplifier E. The output of transducer $Vr$ is connected to the input of a dispersive delay line LD. The output of this latter line is connected by means of a detector D, to the other input of bistable BST.

Bistable BST delivers its output voltage to an input of an AND gate ET, whose other input receives pulses having a fixed repetition frequency, these pulses being generated by a clock H. The output of the AND gate ET is connected to a counter CT.

Figure 3:
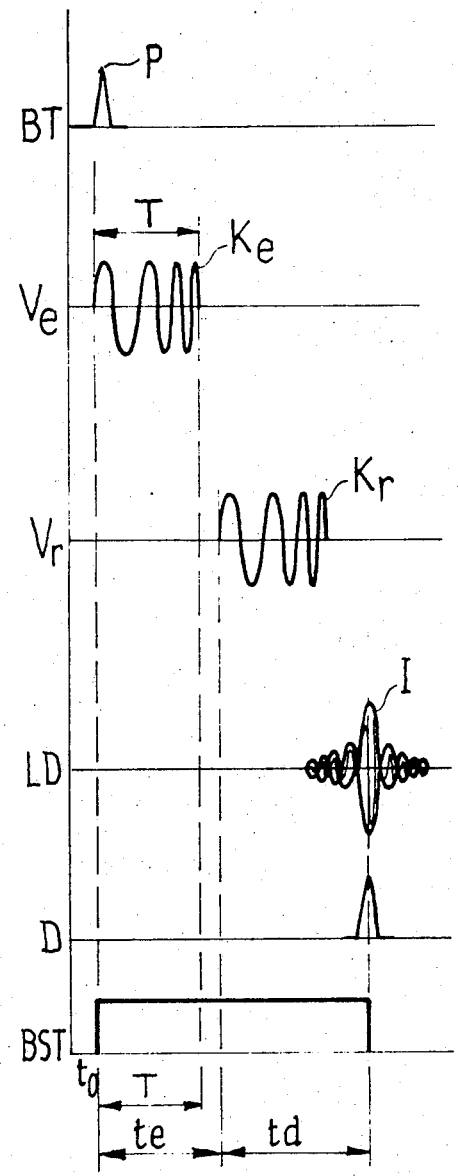

As shown in FIG. 3, the transmitted ultrasonic wave train $K_e$ has a duration T which can be relatively long, $Vr$ and $Vc$ having a band width including the upper and lower frequencies of train $K_e$.

Delay line LD has a dispersive delay time versus frequency characteristic such that the instantaneous frequency occuring at the beginning of the frequency modulated wave train is delayed more than the one occuring at its end, i.e. it has the effect of shortening the duration of the frequency modulated wave train applied to its input. If the law, according to which the wave is frequency-modulated, is adapted to this characteristic, the output of the delay line LD will deliver, after a delay time $td$ of fixed value, a so called compressed pulsed wave train of very short duration; detector D delivers in response to this wave train a pulse for resetting the bistable BST to its 0 state.

The diagrams shown in FIG. 3 explain the operation of the device.

The duration of the square wave voltage delivered by bistable BST is equal to $te + td$, $te$ being the time elapsed during the propagation of sonic wave train $K_e$ from vibrator $Ve$ to $Vr$ and $td$ being the above-mentioned delay time of LD.

Clock H and counter CT allow the counting of pulses produced within the time interval $te + td$.

The pulse P delivered by the timing circuit BT is shown in the first diagram.

The sonic wave train $Ke$ delivered by Vibrator $Ve$ is a frequency modulated wave having a duration T and an envelope of substantially rectangular shape.

The electrical wave train $K_r$ delivered by $Vr$ response to the sonic one received has substantially the same wave form, but is delayed by a time $te$ with respect to wave train $Ke$.

The compressed wave train I delivered by delay line LD has a much shorter duration than wave train $K_r$; diode D delivers a triggering pulse similar to that supplied from BT.

Consequently, the switching times of the bistable BST are determined with a very great accuracy.

Figure 2:
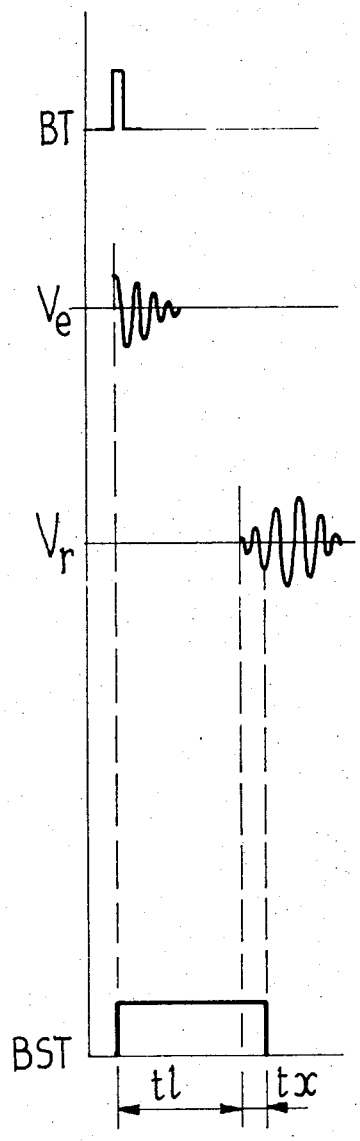
FIGS. 2 and 3 are diagrams illustrating the waveforms at different points in two systems, one of which being a prior art system and this other one according to the invention.

In the case of FIG. 2 corresponding to a device without delay line, the applied signal is necessarily a short voltage pulse. Because of natural phenomena due to the selectivity of the vibrators and the elasticity of the fluid, the short signal produces at the output of the vibrator $Ve$ a longer signal whose envelope decays in accordance with an exponential function and then, after the delay $tl$ resulting from the passage of the acoustic wave through the fluid, the signal appearing at the output of the vibrator $Vr$ has an exponential rise and an exponential decay. This exponential rise of the envelope is an obstacle to a precise resetting (without jitter) of the bistable multivibrator to its initial condition the part of the bistable trigger stage BST and, at the output of the latter, the duration of the rectangular waveform signal is equal to the delay $tl$ plus an error interval $tx$ which is determined by the instant at which the bistable trigger stage switches from one state to another. This error interval fluctuates because of the random the rise law of the signal received by $Vr$ and, consequently, because of the uncertainty in the instant at which the signal exceeds the threshold value at which the bistable multivibrator can be triggered.

The indication obtained for the velocity of the sound, modified or otherwise by the velocity of the fluid, can be used directly in various apparatus such as those designed as to detect the fronts defining different products circulating through one and the same pipe, or to follow the development of or determine the quality of said products. This application is of course in no way limitative of the scope of this particular ultrasonic velocity measuring method.

The method and system in accordance with the invention likewise makes it possible to measure the velocity of flow and flowrate of a fluid circulating through a pipe, provided that several acoustic trajectories are arranged in said pipe. In addition to this absolute measurement, a differential flow velocity measurement at two points in a pipe can be carried out in order to determine, for example, whether or not there are any leaks in the pipe. This application is equally not limited to this particular method of measuring velocity of flow by ultrasonic techniques. The conventional method of measurement of the phase shift between the emitted and received waves, could equally well be employed.

Figure 4:
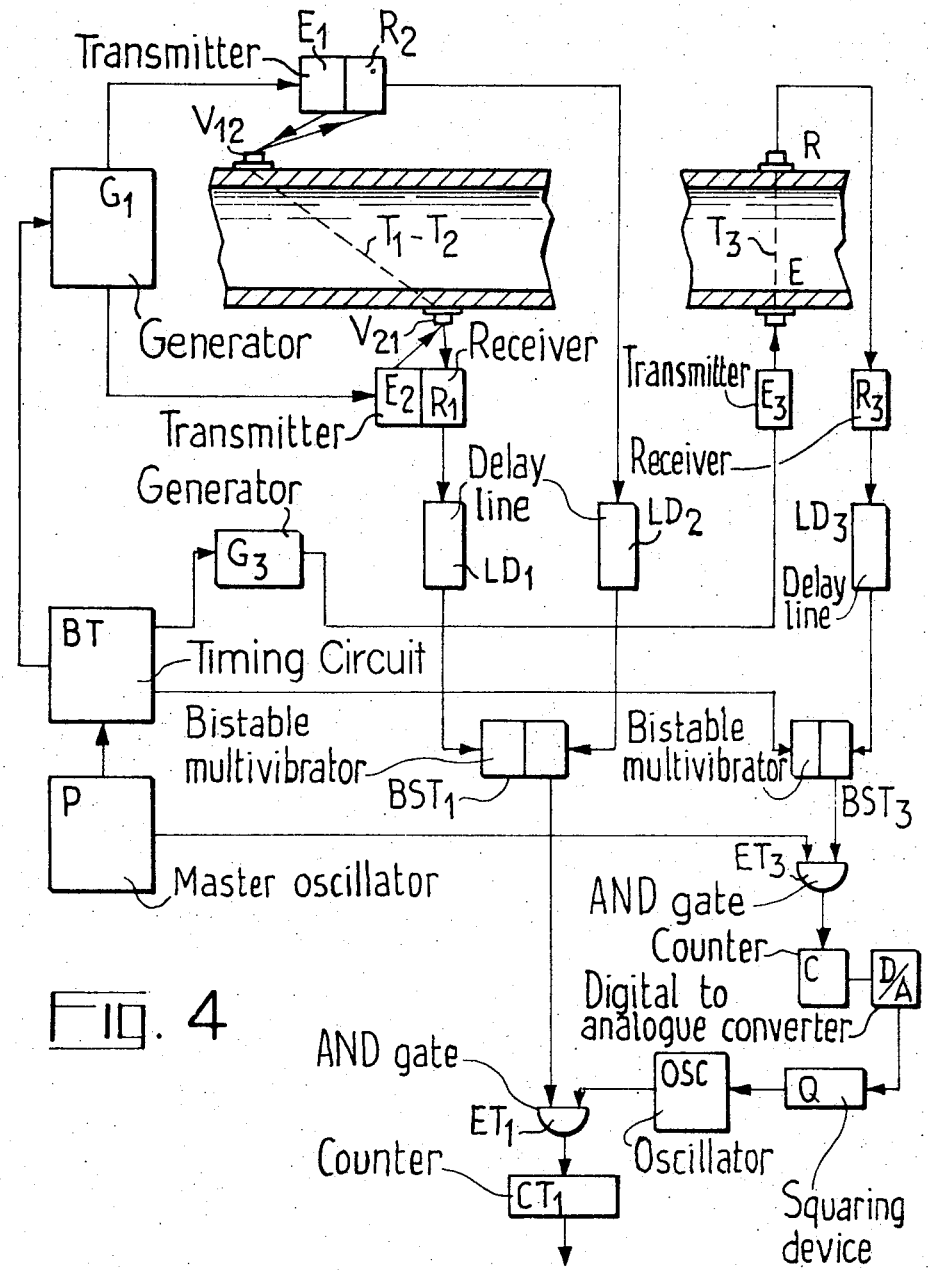
FIG. 4 is the diagram of a flowmeter using the system in accordance with the invention.

FIG. 4 shows an embodiment which can be, according to the invention used as a flowmeter, for metering the flowrate of a fluid in a pipe.

This embodiment is made of devices of the type shown in FIG. 1.

It comprises:

a. Two transducers $V_{21}$ and $V_{12}$ each of which being both capable of receiving a sonic wave train and of transmitting the same toward the other. The sound beams are at an angle $\theta$ with respect to the flow direction. Transducers $V_{12}$ and $V_{21}$ have their respective inputs connected to transmitter-amplifiers $E_1$ and $E_2$, and their respective outputs connected to receiver-amplifiers $R_1$ and $R_2$.

Amplifiers $E_1$ and $E_2$ have their inputs connected to the output of an electrical wave train generator $G_1$. This generator is identical to that of FIG. 1.

Amplifiers $R_1$ and $R_2$ have their respective inputs connected to the respective outputs of $V_{21}$ and $V_{12}$. Their respective outputs are connected to respective dispersive delay lines $LD_1$ and $LD_2$ identical to the delay line LD of FIG. 1.

The outputs of these delay lines are respectively connected through diode means not shown respectively to the complementary triggering inputs of a first bistable multivibrator BST 1. A master oscillator P controls a timing circuit BT, which in turn controls the operation of generator $G_1$ as hereinabove described.

The output of bistable BST 1 is connected to the first input of a first AND gate ET1, the output of which is connected to a first counter CT1, the read out of which is proportional to the velocity to be measured.

This part of the device operates as follows:

Under the triggering action of timing circuit BT and of generator G1, transducers $V_{12}$ and $V_{21}$ transmit simultaneously two frequency modulated wave trains as in FIG. 1.

The upstream wave train travels from $V_{12}$ to $V_{21}$, and the downstream wave train travels from $V_{12}$ to $V_{21}$, the respective propagation times being T2 and T1, T2 being higher than T1.

It can be shown, that if L is the distance separating transducers $V_{12}$ from $V_{21}$ :

$$T1 = L/(c+v \cos \theta)$$

$$T2 = L/(c-v \cos \theta)$$

$c$ being the sound velocity in the fluid, $v$ the velocity of the fluid to be measured, and $\theta$ the angle between the trajectory and the beam direction. As $v^2$ is generally negligible compared to $c^2$, the difference between the upstream and downstream travel time intervals can be written as:

$$T2 - T1 \approx (2 \, Lv \cos \theta)/c^2$$

The measurement of $T2 - T1$ gives the value of $v$, if $c$ is known.

Bistable BST1 delivers a rectangular pulse voltage, the duration of which is proportional to $T2 - T1$. As a matter of fact, the result does not depend from the delays introduced by the two identical delay lines; these delays being the same.

A second pair of transducers E and R are mounted, in the same way $V_{12}$ and $V_{21}$, for respectively transmitting and receiving a sonic beam perpendicular to the flow direction, said beam crossing the pipe along a diameter thereof.

The circuits associated with these transducers i.e. transmitter $E_3$, receiver $R_3$, delay line LD3, and bistable BST 3 are identical to those of FIG. 1.

A second generator G3, controlled by timing circuit BT is connected to transmitter E3. Timing circuit BT is also connected to the setting trigger input of the second bistable multivibrator BST 3, the resetting input of which is connected to the output of delay line LD3 through diode means not shown.

As in FIG. 1, the second bistable multivibrator delivers a rectangular pulse voltage, the duration of which is T, and for which $T - t = D/c$, $t$ being the delay time of the second delay line LD3, and D the diameter of the pipe.

The output of BST 3 is connected to a circuit arrangement capable of generating a pulse train, having a repetition frequency which is a linear function of $c^2$.

Thus, the output of oscillator P is coupled to a second AND gate ET3, the other input of which receives the output rectangular voltage waveform of BST 3. The output of the gate ET3 is connected to a counter C. This latter delivers, for each pulse received, an output voltage which is delivered in turn to a digital-to-analogue converter D/A. This latter comprises a capacitor, the charge of which is a linear function of the number of pulses delivered by the counter. At the end of the count, the converter delivers a voltage V the value of which is proportional to the count of counter C.

Bistable BST3 is in the state 1 during a time interval equal to $D/c + t$. The end value of voltage V is as a consequence a linear function of $1/c$.

A squaring device Q, receives this voltage V and delivers a voltage $U = V^2$, function of $1/c^2$.

This voltage is applied to the frequency control input of a voltage controlled variable frequency pulse generator OSC, the output of which is connected to the other input of the first AND gate ET1. The repetition frequency of the pulses delivered by the generator OSC varies proportionally with $1/c^2$.

The first counter CT1 counts these latter pulses during the time $T2 - T1$.

The count displayed is equal to $2 LV \cos \theta$; it is proportional to V since L and $\theta$ are perfectly known.

The pulse compression technique makes it possible to considerably lengthen the duration of the transmitted wave train signals and thus to operate in a quasi-stationary condition without, however, losing the time resolution, because compression is carried out at the receiving end.

This technique is directly applicable to the measurement of the propagation time over the transverse trajectory, that is to say to the measurement of the ultrasonic velocity. It is likewise applicable to the oblique trajectories, that is to say to the measurement of the flow velocity since it enables us to replace the sometimes delicate operation of measuring the phase, by a measurement of the delay between two instants which are perfectly established in time; these are in other words the instants of beginning of the transmission of the sonic wave train and that at which the received wave train is produced at the output of the delay line. Accurate measurement of the different transmission times across the fluid is thus possible without the need to resort to a phase measurement.

This method is of especial significance in the context of measuring propagation times through gases.

What I claim, is:

1. An ultrasonic system for cyclically measuring the flow of a fluid in a pipe, comprising in combination:

first means for repeatedly generating a timing signal at the beginning of each measuring cycle;

second means triggered by said first means for generating a first electrical wave train of fixed duration, frequency modulated according to a predetermined law between fixed upper and lower frequencies, at least a first pair of opposed transducer means for location on opposite sides of said pipe, including a first transducer for converting said first wave train into a first sound wave and for transmitting said first sound wave along a first path through the fluid within said pipe and a second transducer for receiving said transmitted first sound wave and for converting said received sound wave into a second electrical wave train;

first means for applying said first wave train to said first transducer;

first delay line means having a dispersive delay time versus frequency characteristic, fed by said second transducer for converting said second electrical wave train into a first compressed one of short duration;

first detector means fed by said first delay line means for delivering a first compressed pulse in response to said first compressed wave train;

a first bistable multivibrator having a first triggering input for receiving said timing signal and an output for delivering in response thereto a non-zero value constant voltage and a second triggering input for receiving said first compressed pulse and for delivering at said output in response thereto a zero value voltage, whereby said first multivibrator output delivers a first rectangular waveform having a duration equal to the sum of the sound wave propagation time interval across the fluid between said first and second transducers and the constant delay time interval provided by said delay line means.

2. A system as claimed in claim 1, further comprising first means for measuring the duration of said first rectangular waveform.

3. A system as claimed in claim 2, wherein said first means for measuring comprises:
   clock means having an output for delivering recurrent pulses;
   a first AND gate having a first input coupled to said first multivibrator output, a second input coupled to said clock output and an output, and
   first counter means having an input coupled to said first gate output and an output for delivering a digital count corresponding to the number of clock pulses transmitted by said first gate during said first rectangular waveform.

4. A system as claimed in claim 3, wherein said first path is perpendicular to the flow direction, said system further comprising:
   third means triggered by said first means for generating a third electrical wave train of fixed duration, frequency modulated according to a predetermined law between fixed upper and lower frequencies;
   a second pair of opposed transducer means for location on opposite sides of said pipe on an axis obliquely inclined with respect to the flow direction, including a third and a fourth transducer for alternately simultaneously converting said third wave train respectively into a second and a third sound wave and for respectively transmitting said second and third sound waves along said oblique axis in both the upstream and downstream directions, and for respectively receiving said second and third sound waves and converting same into a fourth and a fifth electrical wave train;
   second means for applying said third electrical wave train to said third and fourth transducers;
   second and third dispersive delay line means respectively fed by said third and fourth transducers, for respectively converting said third and fourth electrical wave trains into a second and a third compressed ones, of short duration;
   second and third detector means respectively fed by said second and third delay line means for respectively delivering a second and a third compressed pulse in response to said second and third compressed wave trains;
   a second bistable multivibrator having a first triggering input for receiving said second compressed pulse and an output for delivering in response thereto a non-zero value constant voltage, and a second triggering input for receiving said third compressed pulse and for delivering at said output in response thereto a zero value voltage, said second multivibrator output delivering a second rectangular waveform, whose duration is substantially equal to the difference between the upstream and downstream propagation time intervals of said sound waves;
   and second means for measuring the duration of said second rectangular waveform.

5. A system as claimed in claim 4, wherein said clock means is made up from a master oscillator delivering constant frequency pulses and wherein said second measuring means comprises:
   a digital-to-analog converter fed by the output of said first counter means for delivering a voltage proportional to said digital count;
   a squaring circuit fed by said converter for delivering a control voltage equal to the square of said proportional voltage;
   a voltage controlled variable frequency pulse generator having a control input fed by said control voltage and an output for delivering a pulse train whose repetition frequency is a linear function of said control voltage;
   a second AND gate having a first input coupled to said second multivibrator output, a second input coupled to said variable frequency generator output, and an output;
   second counter means having an input coupled to said second gate output, and an output for delivering a count proportional to the flow velocity of the fluid.

* * * * *